United States Patent
Jung et al.

(10) Patent No.: US 12,435,895 B2
(45) Date of Patent: Oct. 7, 2025

(54) WIRED REMOTE CONTROLLER AND POWER SAVING METHOD THEREFOR

(71) Applicant: Samsung Electronics Co., Ltd., Suwon-si (KR)

(72) Inventors: Rakchung Jung, Suwon-si (KR); Doyeon Kim, Suwon-si (KR); Taebok Hur, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 17/980,066

(22) Filed: Nov. 3, 2022

(65) Prior Publication Data

US 2023/0055486 A1 Feb. 23, 2023

Related U.S. Application Data

(63) Continuation of application No. PCT/KR2021/006330, filed on May 21, 2021.

(30) Foreign Application Priority Data

Jul. 1, 2020 (KR) .................. 10-2020-0081171

(51) Int. Cl.
*F24F 11/52* (2018.01)
*F24F 11/46* (2018.01)
(Continued)

(52) U.S. Cl.
CPC .............. *F24F 11/46* (2018.01); *F24F 11/52* (2018.01); *F24F 11/56* (2018.01); *H04Q 9/00* (2013.01); *G05B 2219/2614* (2013.01)

(58) Field of Classification Search
CPC . F24F 11/46; F24F 11/52; F24F 11/56; H04Q 9/00; G05B 2219/2614
See application file for complete search history.

(56) References Cited

U.S. PATENT DOCUMENTS

| | | |
|---|---|---|
| 9,733,001 B2 | 8/2017 | Lim et al. |
| 10,261,573 B2 | 4/2019 | Sunwoo et al. |
| (Continued) | | |

FOREIGN PATENT DOCUMENTS

| | | |
|---|---|---|
| JP | 11-294844 A | 10/1999 |
| JP | 2010-107123 A | 5/2010 |
| (Continued) | | |

OTHER PUBLICATIONS

International Search Report dated Aug. 27, 2021, issued in an International Application No. PCT/KR2021/006330.

*Primary Examiner* — Michael W Choi
(74) *Attorney, Agent, or Firm* — Jefferson IP Law, LLP

(57) ABSTRACT

A wired remote controller is provided. The wired remote controller includes a display panel, a wired interface that is connected to an indoor unit by wire, a memory in which information on a power capacity for each indoor unit model is stored, and a processor that receives power from the indoor unit through the wired interface and communicates with the indoor unit through the wired interface, wherein the processor is configured to receive information on power consumption of the indoor unit through the wired interface, identify a power capacity corresponding to the indoor unit based on the information on the power capacity stored in the memory, and adjust the brightness of the display panel based on the identified power capacity and the received power consumption of the indoor unit.

16 Claims, 10 Drawing Sheets

(51) Int. Cl.
*F24F 11/56* (2018.01)
*H04Q 9/00* (2006.01)

(56) References Cited

U.S. PATENT DOCUMENTS

| | | | | |
|---|---|---|---|---|
| 2008/0306632 | A1* | 12/2008 | Miki | F24F 11/62 |
| | | | | 700/276 |
| 2012/0186287 | A1* | 7/2012 | Kawai | F24F 11/56 |
| | | | | 62/126 |
| 2013/0319018 | A1 | 12/2013 | Lim et al. | |
| 2014/0238061 | A1* | 8/2014 | Shimamoto | F25B 13/00 |
| | | | | 62/160 |
| 2015/0000310 | A1* | 1/2015 | Lee | F25B 49/02 |
| | | | | 62/126 |
| 2016/0147292 | A1 | 5/2016 | Sunwoo et al. | |
| 2016/0169571 | A1* | 6/2016 | Kimura | F25B 49/02 |
| | | | | 62/155 |
| 2017/0082309 | A1 | 3/2017 | Tanaka | |
| 2019/0041080 | A1* | 2/2019 | Higuchi | H04W 4/38 |
| 2020/0208863 | A1* | 7/2020 | Fujiwara | F24F 11/65 |
| 2021/0348793 | A1* | 11/2021 | Luo | H04L 67/141 |

FOREIGN PATENT DOCUMENTS

| | | |
|---|---|---|
| JP | 4894845 B2 | 3/2012 |
| JP | 2013-029258 A | 2/2013 |
| JP | 2013-181693 A | 9/2013 |
| JP | 2014-211294 A | 11/2014 |
| JP | 5720474 B2 | 5/2015 |
| KR | 10-0514562 B1 | 9/2005 |
| KR | 10-2013-0134349 A | 12/2013 |
| KR | 10-2014-0113792 A | 9/2014 |
| KR | 10-2020-0013917 A | 2/2020 |
| KR | 10-2016-0061105 A | 11/2021 |

\* cited by examiner

FIG. 7

| INDOOR UNIT TYPE | WIRED REMOTE CONTROLLER | LCD BRIGHTNESS |
|---|---|---|
| A(SMPS : 1200W) | 1 UNIT | 100% |
| | 2 UNITS | 70% |
| | 3 UNITS | 60% |
| B(SMPS : 1000W) | 1 UNIT | 90% |
| | 2 UNITS | 60% |
| | 3 UNITS | 50% |
| C(SMPS : 700W) | 1 UNIT | 80% |
| | 2 UNITS | 50% |
| | 3 UNITS | 40% |

WIRED REMOTE CONTROLLER AND POWER SAVING METHOD THEREFOR

CROSS-REFERENCE TO RELATED APPLICATION(S)

This application is a continuation application, claiming priority under § 365(c), of an International application No. PCT/KR2021/006330, filed on May 21, 2021, which is based on and claims the benefit of a Korean patent application number 10-2020-0081171, filed on Jul. 1, 2020, in the Korean Intellectual Property Office, the disclosure of which is incorporated by reference herein in its entirety.

BACKGROUND

1. Field

The disclosure relates to a wired remote controller and a power saving method therefor. More particularly, the disclosure relates to a method of reducing power consumption of a wired remote controller receiving power from an indoor unit.

2. Description of Related Art

Recently, various types of air conditioners have been developed and distributed with technology development in air conditioner-related fields. To operate the air conditioner, a user uses a remote controller. For the embedded air conditioner, a wired remote controller is more widely used than a wireless remote controller. Unlike the wireless remote controller, the wired remote controller is often connected to an indoor unit through a power line to receive power. In this case, when the power consumed by the wired remote controller is large, the power to be used in the indoor unit may become insufficient. In particular, in recent years, as thin-film transistor (TFT) liquid-crystal display (LCD) is used as a display of the wired remote controller or a high-speed microcomputer (MICOM) is used, the power consumed by the wired remote controller has increased. Accordingly, there is a need to control the indoor unit so as not to cause a problem in the operation of the indoor unit.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of The disclosure is to provide a wired remote controller and a power saving method therefor capable of automatically adjusting a load capacity of the wired remote controller when a power capacity of an indoor unit is insufficient by the wired remote controller connected to an indoor unit to prevent a problem with an operation of the indoor unit and the wired remote controller.

Additional aspects will be set forth in part in the description which follows and, in part, will be apparent from the description, or may be learned by practice of the presented embodiments.

In accordance with an aspect of the disclosure, a wired remote controller for controlling an indoor unit is provided.

The wired remote controller includes a display panel, a wired interface that is connected to the indoor unit by wire, a memory in which information on a power capacity for each indoor unit model is stored, and a processor that receives power from the indoor unit through the wired interface and communicates with the indoor unit through the wired interface, in which the processor is configured to receive information on power consumption of the indoor unit through the wired interface, identify a power capacity corresponding to the indoor unit based on the information on the power capacity stored in the memory, and adjust brightness of the display panel based on the identified power capacity and the received power consumption of the indoor unit.

The processor may calculate the power consumption of the wired remote controller, and reduce the brightness of the display panel when a value obtained by subtracting the received power consumption of the indoor unit and the calculated power consumption of the wired remote controller from the identified power capacity is out of a critical range, and increase the brightness of the display panel when the subtracted value is within the critical range.

When a plurality of wired remote controllers are connected to the indoor unit and the wired remote controller operates as a master remote controller among the plurality of wired remote controllers, the processor may adjust the brightness of the display of each of the plurality of wired remote controllers based on the total number of wired remote controllers connected to the indoor unit.

When the processor is connected to the indoor unit through the wired interface, the processor may transmit a start-up response to the indoor unit, and operate as a master or a slave according to a transmission order of the start-up response between the plurality of wired remote controllers connected to the indoor unit.

The processor may receive information on power consumption of other wired remote controllers among the plurality of wired remote controllers through the wired interface, calculate the total power consumption of the plurality of wired remote controllers by summing the power consumption of the other wired remote controllers and the power consumption of the wired remote controller, and reduce the brightness of the display panel of each of the plurality of wired remote controllers when a value obtained by subtracting the power consumption of the indoor unit and the total power consumption of the plurality of wired remote controllers from the identified power capacity is out of a critical range, and increase the brightness of the display panel of each of the plurality of wired remote controllers when the subtracted value is within the critical range.

The processor may receive information on the indoor unit model through the wired interface, and identify a power capacity corresponding to the received information on the model based on information stored in the memory.

When at least one of the information on the indoor unit model and the information on the power capacity corresponding to the information on the model is not stored in the memory, the processor may request the information on the power capacity of the indoor unit through the wired interface.

The processor may set the brightness of the display panel to 50% during initial communication with the indoor unit, and increase or decrease the brightness of the display panel by more than 50% based on the identified power capacity and the received power consumption of the indoor unit.

The processor may adjust a communication cycle between the indoor unit and other wired remote controllers among the plurality of wired remote controllers based on the total number of wired remote controllers connected to the indoor unit.

The processor may turn off the display panel when no user manipulation is input to the wired remote controller for a preset waiting time while the display panel is turned on, and adjust the waiting time based on the number of wired remote controllers connected to the indoor unit.

In accordance with another aspect of the disclosure, a power saving method for a wired remote controller connected to an indoor unit through a wired interface is provided. The power saving method includes receiving information on power consumption of the indoor unit through the wired interface, identifying a power capacity corresponding to the indoor unit based on pre-stored information on power capacity for each indoor unit model, and adjusting brightness of a display panel provided in the wired remote controller based on the identified power capacity, power consumption of the wired remote controller, and the received power consumption of the indoor unit.

The adjusting of the brightness of the display panel includes calculating the power consumption of the wired remote controller, calculating a value obtained by subtracting the received power consumption of the indoor unit and the calculated power consumption of the wired remote controller from the identified power capacity, and decreasing the brightness of the display panel when the value is out of a critical range, and increasing the brightness of the display panel when the value is within the critical range.

The power saving method further includes adjusting the brightness of the display of each of the plurality of wired remote controllers based on the total number of wired remote controllers connected to the indoor unit when a plurality of wired remote controllers are connected to the indoor unit and the wired remote controller operates as a master remote controller among the plurality of wired remote controllers.

The power saving method further includes transmitting a startup response to the indoor unit when connected to the indoor unit through the wired interface, and receiving a status of the master remote controller from the indoor unit based on a transmission order of a start-up response among the plurality of wired remote controllers connected to the indoor unit.

The power saving method further includes receiving information on power consumption of other wired remote controllers among the plurality of wired remote controllers through the wired interface, calculating the total power consumption of the plurality of wired remote controllers by summing the power consumption of the other wired remote controllers and the power consumption of the wired remote controller, and reducing the brightness of the display panel of each of the plurality of wired remote controllers when a value obtained by subtracting the power consumption of the indoor unit and the total power consumption of the plurality of wired remote controllers from the identified power capacity is out of a critical range, and increasing the brightness of the display panel of each of the plurality of wired remote controllers when the subtracted value is within the critical range.

The method further includes setting the brightness of the display panel to 50% during initial communication with the indoor unit, in which, in the adjusting of the brightness of the display panel, based on the identified power capacity and the received power consumption of the indoor unit, it is possible to increase or decrease the brightness of the display panel by more than 50%.

The method further includes adjusting a communication cycle between the indoor unit and other wired remote controllers among the plurality of wired remote controllers based on the total number of wired remote controllers connected to the indoor unit.

The method includes turning off the display panel when no user manipulation is input to the wired remote controller for a preset waiting time while the display panel is turned on, and adjusting the waiting time based on the number of wired remote controllers connected to the indoor unit.

In accordance with another aspect of the disclosure, an air conditioning system is provided. The air conditioning system includes an indoor unit and a wired remote controller that is connected to the indoor unit by wire to receive power, and controls the operation of the indoor unit according to a user manipulation, in which the wired remote controller may receive information on power consumption of the indoor unit, identify a power capacity corresponding to the indoor unit based on the pre-stored information on power capacity for each indoor unit model, and adjust the brightness of the display panel provided in the wired remote controller based on the identified power capacity and the received power consumption of the indoor unit.

When the plurality of wired remote controllers are connected to the indoor unit and the wired remote controller operates as a master remote controller among the plurality of wired remote controllers, the wired remote controller may adjust the brightness of the display of each of the plurality of wired remote controllers based on the total number of wired remote controllers connected to the indoor unit.

According to various embodiments of the disclosure, when a power capacity of an indoor unit is insufficient due to a wired remote controller connected to the indoor unit, it is possible to solve a problem that may occur in the operation of the indoor unit and the wired remote controller. In addition, when a plurality of wired remote controllers are connected to one indoor unit, it is possible to prevent a problem from occurring in an entire system by adjusting the increase in load capacity due to the plurality of wired remote controllers.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram for describing brightness of a display panel according to a power capacity of an indoor unit and the number of wired remote controllers connected to the indoor unit according to an embodiment of the disclosure;

The same reference numerals are used to represent the same elements throughout the drawings.

DETAILED DESCRIPTION

Figure 1:
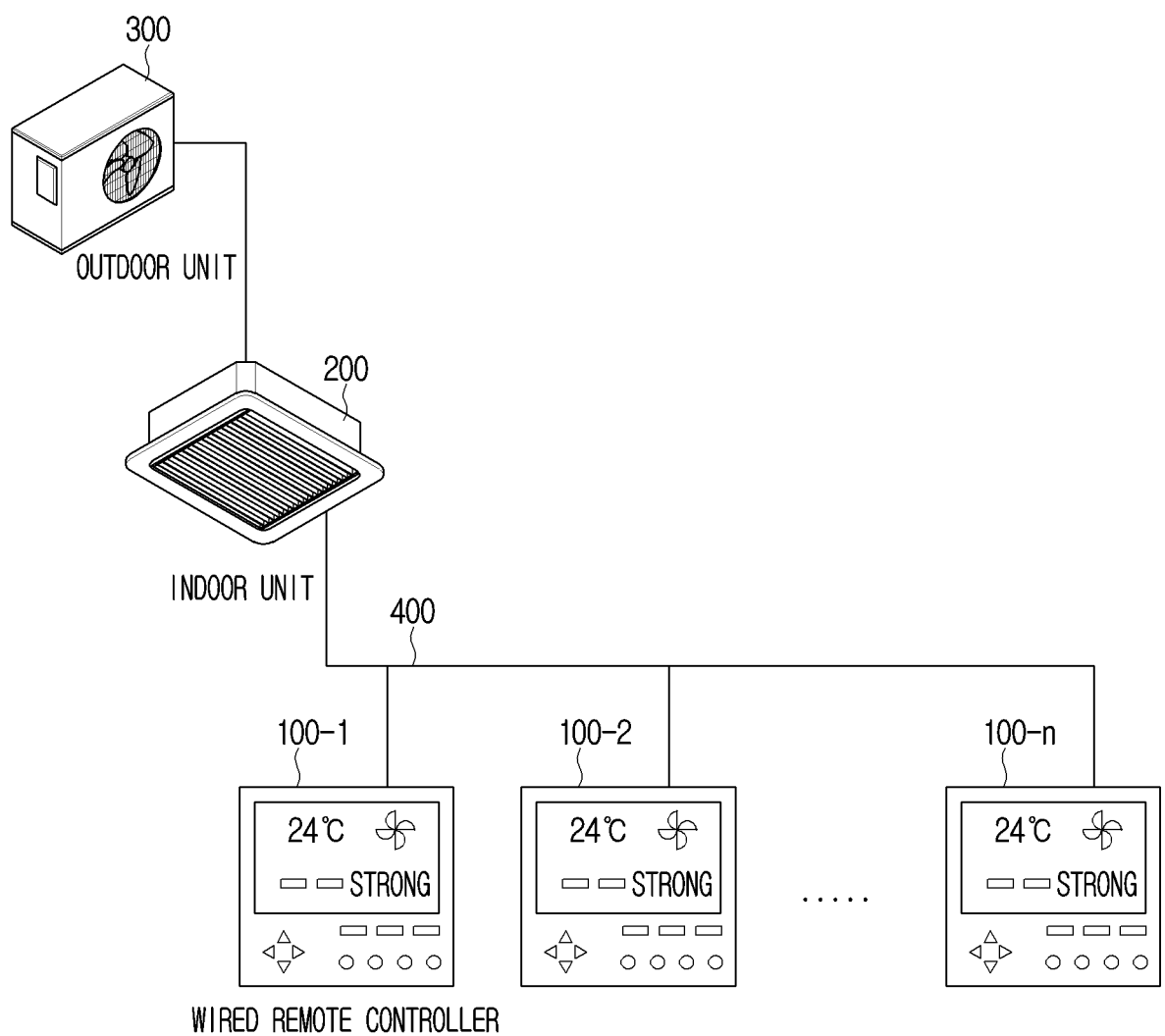
FIG. 1 is a diagram for describing a configuration of an air conditioning system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

Terms 'first', 'second', and the like, may be used to describe various components, but the components are not to be construed as being limited by these terms. The terms are used only to distinguish one component from another component.

An expression "at least one of A and/or B" is to be understood to represent "A" or "B" or "any one of A and B".

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It should be understood that terms "comprise" or "include" used in the disclosure, specify the presence of features, numerals, steps, operations, components, parts mentioned in the disclosure, or combinations thereof, but do not preclude the presence or addition of one or more other features, numerals, steps, operations, components, parts, or combinations thereof.

In the disclosure, a "module" or a "~er/or" may perform at least one function or operation, and be implemented by hardware or software or be implemented by a combination of hardware and software. In addition, a plurality of "modules" or a plurality of "~ers/~ors" may be integrated in at least one module and be implemented by at least one processor (not illustrated) except for a "module" or a "~er/or" that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to various embodiments described herein. In addition, in the drawings, portions unrelated to the description will be omitted to obviously describe the disclosure, and similar reference numerals will be used to describe similar portions throughout the specification.

Hereinafter, various embodiments of the disclosure will be described in detail.

FIG. 1 is a diagram for describing a configuration of an air conditioning system according to an embodiment of the disclosure.

Referring to FIG. 1, an air conditioning system 1000 includes an outdoor unit 300, an indoor unit 200, and wired remote controllers 100-1 to 100-*n*. Since the outdoor unit is not directly related to operations described in various embodiments of the disclosure, a description of an outdoor unit will be omitted herein.

Referring to FIG. 1, the indoor unit 200 refers to an air conditioner indoor unit that discharges cold air. Although a plurality of indoor units may be used, a case in which one indoor unit is included is illustrated in FIG. 1. Also, although FIG. 1 illustrates the air conditioning system including the indoor unit 200 that can be installed on a ceiling, the disclosure is not limited thereto. That is, the indoor unit may be implemented as a wall-mounted indoor unit or a stand-type indoor unit.

A cable 400 is a device for relaying communication between the indoor unit 200 and the wired remote controllers 100-1 to 100-*n*. The wired remote controllers 100-1 to 100-*n* receive power from the indoor unit through the cable 400. The cable 400 is connected to the indoor unit 200 by wire to transmit various signals received from the wired remote controllers 100-1 to 100-*n* to the indoor unit 200. In addition, signals or information on the indoor unit 200 side may be transmitted to the wired remote controllers 100-1 to 100-*n*. Also, the cable 400 may transmit signals or information between the plurality of wired remote controllers 100-1 to 100-*n*.

The wired remote controllers 100-1 to 100-*n* are components for controlling the indoor unit 200.

The wired remote controllers 100-1 to 100-*n* may receive a command for controlling the indoor unit 200 from a user and transmit a signal corresponding to the signal to the indoor unit 200 through the cable 400. Also, the wired remote controllers 100-1 to 100-*n* may receive state information of the indoor unit 200 through the cable 400.

As the communication method through the cable 400, power line communication (PLC) may be used.

The indoor unit 200 includes a power supply for supplying power to the wired remote controllers 100-1 to 100-*n*.

A power supply device is not limited to a specific device, but in the disclosure, the power supply device will be described on the premise that the power supply is a switching mode power supply (SMPS).

The SMPS refers to a power supply device by switching operation, and is a power supply device that has the advantage of being able to reduce the size and weight of energy storage components due to the switching frequency of several tens to hundreds of kHz.

The power capacity of the SMPS is determined according to the model of the indoor unit 200, and when a power demand exceeding a power capacity occurs, there is a problem in the operation of the indoor unit.

When the plurality of wired remote controllers (100-1 to 100-*n*) are provided as illustrated in FIG. 1, one of the wired remote controllers 100-1 to 100-*n* may operate as a master remote controller, and the rest may operate as a slave remote controller. The wired remote controller operating as the master remote controller may also control the operation of other remote controllers, that is, slave remote controllers. For example, when it is determined that power saving is required, the master remote controller may perform a power saving operation by itself, and may transmit a control signal to the slave remote controller to perform the power saving operation as well. The selection method of the master remote controller and the power saving operation method may be implemented in various ways, but a detailed description thereof will be described later.

The wired remote controllers 100-1 to 100-*n* transmit the control signal to the indoor unit 200, and the indoor unit 200 performs an operation corresponding to the control signal. Specifically, various operations such as turn-on, turn-off, set temperature adjustment, mode change, and timer setting may be performed.

The wired remote controllers 100-1 to 100-*n* may receive various signals or information from the indoor unit 200 or other wired remote controllers. Specifically, information such as information on the indoor unit model, identification information, an on/off state, air volume, or wind speed information, an operating state, and current power consumption of the indoor unit may be received.

In the air conditioning system illustrated in FIG. 1, the wired remote controllers 100-1 to 100-*n* may receive the information on the power consumption of the indoor unit, determine the power capacity corresponding to the indoor unit based on the information on the pre-stored power capacity for each indoor unit model, and adjust the brightness of the display panel, which is a component of the wired remote controllers 100-1 to 100-*n*, based on the identified power capacity and the received power consumption of the indoor unit.

When the plurality of wired remote controllers are connected to the indoor unit and the specific wired remote controller operates as the master remote controller among the plurality of wired remote controllers, the wired remote controller may adjust the brightness of the display of each of the plurality of wired remote controllers based on the total number of wired remote controllers connected to the indoor unit.

Figure 2:
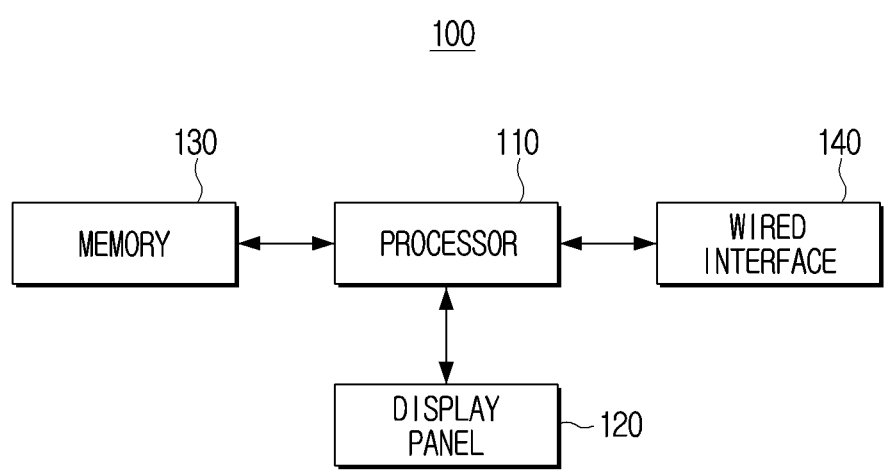
FIG. 2 is a block diagram illustrating a configuration of a wired remote controller according to an embodiment of the disclosure.

FIG. 2 is a block diagram for describing a configuration of the wired remote controller according to an embodiment of the disclosure.

The wired remote controller 100 includes a processor 110, a display panel 120, a memory 130, and a wired interface 140.

The display panel 120 is a component for displaying various pieces of information, menus, etc. When the display panel 120 is implemented as a touch screen, a user may directly touch various menus displayed on the display panel 120 to control the operation of the indoor unit 200. In addition, a user may check various pieces of information displayed on the display panel 120, for example, a current temperature and a set temperature, a current mode, a set strength, and the like. When the display panel 120 is an LCD panel, a backlight module may be used together with the display panel 120. The amount of power consumed by the wired remote controller 100 may vary according to the brightness of the backlight module.

The wired interface 140 refers to a part that may be connected to external devices such as the indoor unit 200 or other wired remote controllers through a wired cable. The wired interface 140 may include at least one wired cable port.

The processor 110 is a configuration for controlling the overall operation of the wired remote controller. In detail, the processor 110 may control components of various hardware or software included in the wired remote controller, and perform various data processing and calculation. In addition, the processor 110 may load and process commands or data received from at least one of other components in the memory 130, and store various data in a non-volatile memory. To this end, the processor 110 may be implemented by a dedicated processor (for example, an embedded processor) for performing a corresponding operation or may be implemented by a generic-purpose processor (for example, a central processing unit (CPU) or an application processor) capable of performing the corresponding operations by executing one or more software programs stored in a memory device.

The processor 110 controls the display panel 120 to display a user interface (UI). When an arbitrary menu is selected in the user UI, the processor 110 performs a control operation corresponding to the selected menu. When the menu for controlling the operation of the indoor unit is selected, the processor 110 transmits the control signal to the indoor unit through the wired interface 140. When it is necessary to operate with other wired remote controllers, the processor 110 may transmit various signals or information to other wired remote controllers through the wired interface 140. In addition, when the indoor unit or other wired remote controllers transmits the signal or information, the processor 110 may receive the signal or information through the wired interface 140.

The memory 130 is a component in which various software or data necessary for the operation of the wired remote controller are stored. Although only one memory 130 is illustrated in FIG. 2, when implemented as an actual product, the memory 130 may be implemented in a form including a non-volatile memory such as ultraviolet electrically programmable read-only memory (UVEPROM) or electrically erasable programmable read-only memory (EEPROM) or a volatile memory. The memory 130 may store information on power capacity for each indoor unit model. When the wired remote controller 100 is a general-purpose remote controller that can be used by being connected to various types of indoor units, the information on the power capacity of the usable indoor units may be stored in the memory 130 for each model. The processor 110 may obtain the information on the power capacity corresponding to the identification information of the currently connected indoor unit from the memory 130. The information stored in the memory 130 may be stored when the wired remote controller 100 is manufactured, may be downloaded later, or may be frequently updated from an external source.

When the wired remote controller 100 is connected to the indoor unit 200, the processor 110 may receive various signals or information from the indoor unit 200 or other wired remote controllers through the wired interface 140. Specifically, information such as information on the indoor unit model, identification information, an on/off state, air volume, or wind speed information, an operating state, and current power consumption of the indoor unit may be received. The processor 110 may use the received information by itself or may transmit the received information to the indoor unit or other wired remote controllers.

When the information on power consumption of the indoor unit is received through the wired interface 140, the processor 110 may identify the power capacity corresponding to the indoor unit from the memory 130, and may perform the power saving operation based on the identified power capacity and the received power consumption of the indoor unit.

The power saving operation means executing a function to reduce the power consumed by the wired remote controller. For example, the processor 110 may adjust the brightness of the display panel 120.

Specifically, the processor 110 calculates the power consumption of the wired remote controller, and reduces the brightness of the display panel when a value obtained by subtracting the power consumption of the received indoor unit and the calculated power consumption of the wired remote controller from the identified power capacity is out of a critical range. On the other hand, when the subtracted value is within the critical range, the brightness of the display panel may be increased.

Here, the critical range may be set to an appropriate value in preparation for the increase in the power consumption value of the indoor unit due to the user manipulation. When the value (power capacity of the indoor unit−power consumption of the indoor unit−power consumption of the wired remote controller) is out of the critical range, the processor may reduce the brightness of the display panel until the calculated value is not out of the critical range.

On the other hand, when the value (power capacity of the indoor unit−power consumption of the indoor unit−power consumption of the wired remote controller) is within the critical range, the processor may reduce the brightness of the display panel until the calculated value is not out of the critical range.

Meanwhile, as described above, when the plurality of wired remote controllers are connected to the indoor unit, one of the wired remote controllers may operate as the master remote controller. Assuming that the wired remote controller 100 of FIG. 2 operates as the master remote controller, the processor may adjust the display brightness of each of the plurality of wired remote controllers based on the total number of wired remote controllers connected to the indoor unit.

Each of the plurality of wired remote controllers may all be the master remote controller. That is, all the wired remote controllers each include the processor 110, the display panel 120, the memory 130, and the wired interface 140, respectively.

In the process of the master wired remote controller adjusting the brightness of the display panel of other wired remote controllers, the processor 110 of the master wired remote controller may transmit a control signal in a pulse width modulation (PWM) method through the wired interface 140.

An example of the brightness adjustment based on the total number of wired remote controllers will be described in detail with reference to FIG. 7.

Here, one of the methods in which a specific wired remote controller itself is identified as a master remote controller will be described.

When the wired remote controller is connected to the indoor unit through the wired interface, the processor transmits a start-up response to the indoor unit, and the wired remote controller having the fastest transmission order of the start-up response among the plurality of wired remote controllers connected to the indoor unit may be designated as the master remote controller.

The method of designating the master remote controller is not limited to the above-described method, and a remote controller that a user operates first among a plurality of wired remote controllers may be designated as the master remote controller.

Alternatively, the remote controller at a specific location among the plurality of wired remote controllers may be set to operate as the master remote controller unconditionally regardless of the connection order operation order. For example, when the air conditioning system of FIG. 1 is installed in a home, a wired remote controller provided in a living room may be set to operate as a master remote controller.

The processor may receive information on power consumption of other wired remote controllers among the plurality of wired remote controllers through the wired interface, calculate the total power consumption of the plurality of wired remote controllers by summing the power consumption of the other wired remote controllers and the power consumption of the wired remote controller, and reduce the brightness of the display panel of each of the plurality of wired remote controllers when a value obtained by subtracting the power consumption of the indoor unit and the total power consumption of the plurality of wired remote controllers from the identified power capacity is out of a critical range, and increase the brightness of the display panel of each of the plurality of wired remote controllers when the subtracted value is within the critical range.

A step of the processor identifying the power capacity of the indoor unit will be described. The processor may receive the information on the indoor unit model through the wired interface, and identify the power capacity corresponding to the received information on the model based on the information stored in the memory.

Since a power capacity (W) of the SMPS according to the information on the model is stored in the memory, the processor may identify the power capacity of the indoor unit to which the wired remote controller is connected.

However, when the connected indoor unit is a newer model or an air conditioner sold in a foreign market, the information on the indoor unit model connected to the memory may not be stored. In this case, when at least one of the information on the indoor unit model and the information on the power capacity corresponding to the information on the model is not stored in the memory, the processor may request the information on the power capacity of the indoor unit through the wired interface.

When the information on the power capacity is received through the wired interface 140 from the indoor unit that has been requested to transmit the information on the power capacity from the wired remote controller, the processor 110 may perform a calculation to adjust the display brightness as described above.

In adjusting the brightness of the display panel of the plurality of wired remote controllers, as in the case of one wired remote controller connected, the critical range may be set to an appropriate value in preparation for the increase in the power consumption value of the indoor unit due to the user manipulation.

When the value (power capacity of the indoor unit−power consumption of the indoor unit−power consumption of the plurality of wired remote controllers) is out of the critical range, the processor may reduce the brightness of the display panel of the plurality of wired remote controllers until the calculated value is not out of the critical range.

On the other hand, when the value (power capacity of the indoor unit−power consumption of the indoor unit−power consumption of the plurality of wired remote controllers) is within the critical range, the processor may reduce the brightness of the display panel of the plurality of wired remote controllers until the calculated value is not out of the critical range.

When the wired remote controller is connected to the indoor unit for the first time, the communication with the indoor unit may start while maintaining the brightness of the display panel at a certain level. Specifically, the processor 110 may set the brightness of the display panel to 50% during initial communication with the indoor unit, and increase or decrease the brightness of the display panel by more than 50% based on the identified power capacity and the received power consumption of the indoor unit. A detailed description thereof will be given in FIG. 3.

Although the case of adjusting the brightness of the display panel has been described above, various power saving methods may be used in addition to this.

Specifically, the wired remote controller may transmit and receive signals or data by periodically communicating with the indoor unit or other wired remote controllers. For example, information such as the operation mode, the set temperature, the air volume, the wind direction, and additional operation may be transmitted from the indoor unit to the wired remote controller. The wired remote controller may transmit various signals or data about the current state, the ambient temperature, or the like of the wired remote controller to the indoor unit. Also, when the wired remote controller operates as the master wired remote controller, it is also possible to perform an operation of searching whether a new slave wired remote controller is connected. In the disclosure, these operations may be repeatedly performed according to at least one preset communication cycle. When the communication cycle is short, the surrounding information may be updated quickly, but the power consumption increases because a lot of signal transmission/reception work is required as much.

The processor 110 may extend the communication cycle if it is determined that the power consumption of the wired remote controller needs to be reduced by comprehensively considering the power consumption of the wired remote controller, the power consumption of the received indoor unit, and the identified power capacity. If the communication cycle is long, the wired remote controller may reduce the number of times it communicates with surrounding devices for a certain period of time, thereby reducing the power consumption. When the plurality of wired remote controllers are connected to the indoor unit, the communication cycle may be adjusted according to the number of wired remote controllers. This will be described in detail with reference to FIG. 10.

As other methods of reducing power consumption of wired remote controllers, there is a method of shortening a waiting time when a display is turned on. The waiting time refers to the time that the display panel or other parts remain active until a user operation is input while the operation of the display panel or other parts is activated. When a user manipulation is input before the waiting time ends, the processor 110 resets the waiting time and calculates the waiting time again while performing an operation corresponding to the user manipulation. When no operation is performed for the waiting time, the processor 110 turns off the display panel or other components to minimize power consumption.

The processor 110 may shorten the communication cycle if it is determined that the power consumption of the wired remote controller needs to be reduced by comprehensively considering the power consumption of the wired remote controller, the power consumption of the received indoor unit, and the identified power capacity. When the waiting time is shortened, the power consumed by the wired remote controller may be further reduced as much. When several wired remote controllers are connected to the indoor unit, the communication cycle may be adjusted according to the number of wired remote controllers. This will be described in detail with reference to FIG. 9.

Figure 3:
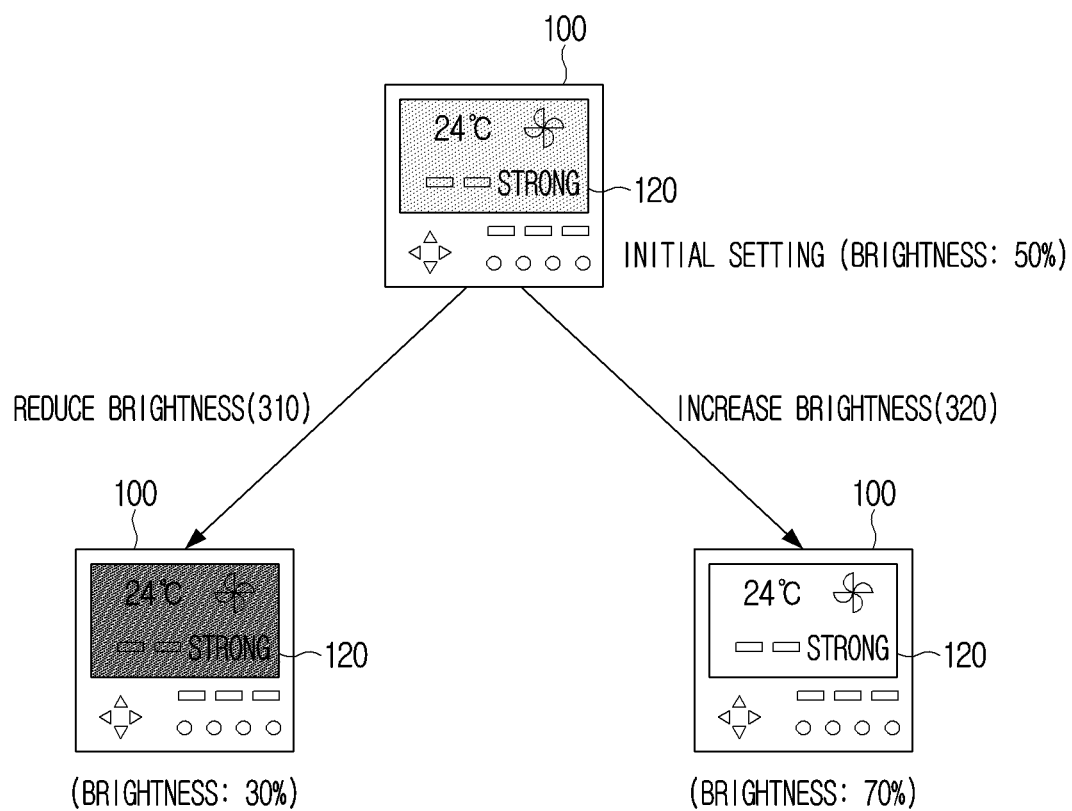
FIG. 3 is a diagram for describing a method of adjusting brightness of a display panel according to an embodiment of the disclosure.

FIG. 3 is a diagram for describing a method of adjusting brightness of a display panel according to an embodiment of the disclosure.

When the wired remote controller is connected to the indoor unit, the brightness of the display panel is set to 50% and the communication may start. The value of 50% is just an example of an appropriate value that does not affect the operation of the indoor unit when the wired remote controller is connected to the indoor unit, and the manufacturers can set the brightness value of the initial display panel to any other value.

Specifically, the processor may calculate the power consumption of the wired remote controller 100, and reduce the brightness of the display panel when a value obtained by subtracting the power consumption of the indoor unit and the calculated power consumption of the wired remote controller from the identified power capacity of the outdoor unit is out of a critical range, and increase the brightness of the display panel when the subtracted value is within the critical range.

Here, the critical range may be set to an appropriate value in preparation for the increase in the power consumption value of the indoor unit due to the user manipulation. When the value (power capacity of the indoor unit−power consumption of the indoor unit−power consumption of the wired remote controller) is out of the critical range, the processor may reduce the brightness of the display panel until the calculated value is not out of the critical range.

For example, when the (power capacity of the indoor unit−power consumption of the indoor unit−power consumption of the wired remote controller) value is out of the critical range, the processor reduces the brightness of the wired remote controller (310). In this case, if the brightness is set to 30% or less, when the (power capacity of the indoor unit-power consumption of the indoor unit-power consumption of the wired remote controller) value is within the critical range, the processor may reduce the brightness of the display panel 120 to 30%.

On the other hand, when the value (power capacity of the indoor unit–power consumption of the indoor unit–power consumption of the wired remote controller) is within the critical range, the processor may reduce the brightness of the display panel until the calculated value is not out of the critical range.

For example, when the (power capacity of the indoor unit–power consumption of the indoor unit–power consumption of the wired remote controller) value is not out of the critical range, the processor increases the brightness of the wired remote controller (320).

In this case, if the brightness is set to exceed 70% or less, when the (power capacity of the indoor unit-power consumption of the indoor unit-power consumption of the wired remote controller) value is out of the critical range, the processor may increase the brightness of the display panel 120 to 70%.

Figure 4:
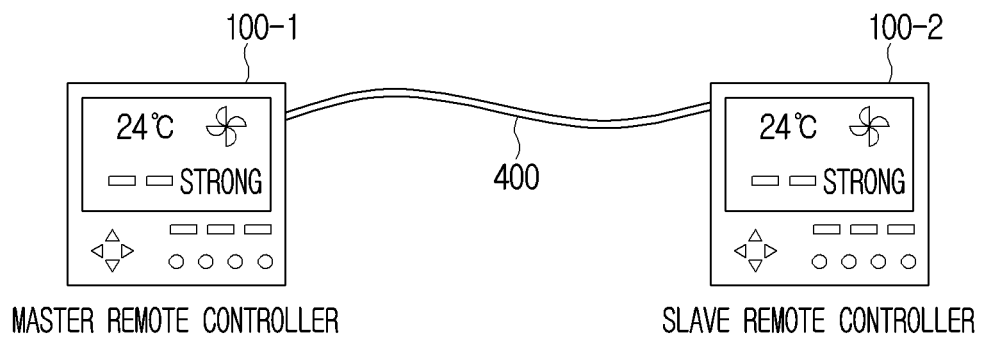
FIG. 4 is a diagram for describing a connection of a plurality of wired remote controllers according to an embodiment of the disclosure.

FIG. 4 is a diagram for describing a connection of a plurality of wired remote controllers according to an embodiment of the disclosure.

Although it is illustrated that the master wired remote controller 100-1 is only connected to the slave wired remote controller 100-2 through the cable 400, instead of one slave wired remote controller, a plurality of slave wired remote controllers may be connected.

The cable 400 connects the master wired remote controller and the slave wired remote controller for the power line communication (PLC) mode communication used for wired communication between the wired remote controller and the indoor unit.

In the process of the master wired remote controller adjusting the brightness of the display panel of the slave wired remote controllers, the processor 110 of the master wired remote controller may transmit a control signal in a pulse width modulation (PWM) method through the wired interface 140.

The processor of the slave wired remote controller adjusts the brightness of each display panel based on the control signal received through the wired interface.

The user may operate the indoor unit not only through the master wired remote controller 100-1 but also through the slave wired remote controller 100-2.

In other words, it may be understood that the master wired remote controller only plays the role of the master in terms of the control function to adjust the display brightness of the plurality of wired remote controllers, and the status of the master and the slave are equal in the process of the user operating the indoor unit.

The same contents are displayed on the display panels of the master wired remote controller and the slave wired remote controller, and the processor of the master wired remote controller also controls the brightness of both the display panels simultaneously.

Data is transmitted and received at regular intervals between the master wired remote controller and the slave wired remote controller. Specifically, the information on the power consumption of each wired remote controller may be periodically transmitted/received.

Figure 5:
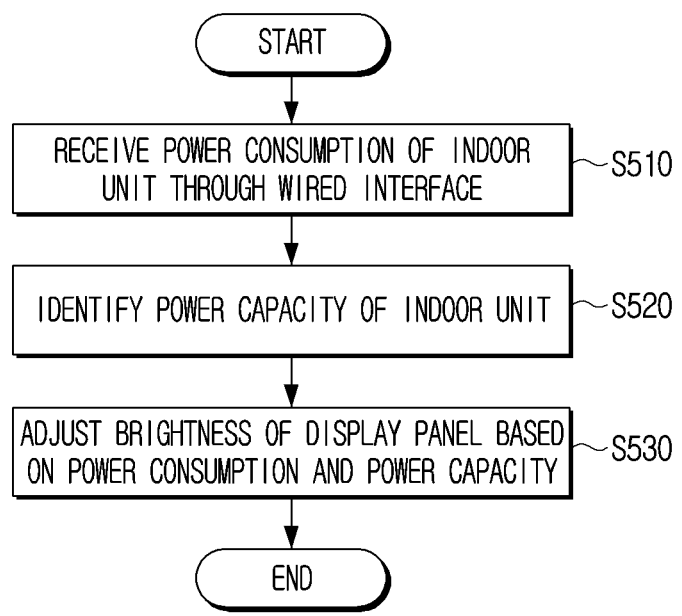
FIG. 5 is a flowchart illustrating a power saving method for a wired remote controller according to an embodiment of the disclosure.

FIG. 5 is a flowchart illustrating a power saving method for a wired remote controller according to an embodiment of the disclosure.

In order to adjust the brightness of the display panel of the wired remote controller, the power saving method may include receiving the information on the power consumption of the indoor unit through the wired interface at operation S510, identifying the power capacity corresponding to the indoor unit based on the information on the pre-stored power capacity for each indoor unit model and the identified power capacity at operation S520, and adjusting the brightness of the display panel included in the wired remote controller based on the identified power capacity, the power consumption of the wired remote controller, and the received power consumption of the indoor unit at operation S530.

Here, the adjusting of the brightness of the display panel at operation S530 may include: calculating the power consumption of the wired remote controller; calculating a value obtained by subtracting the received power consumption of the indoor unit and the calculated power consumption of the wired remote controller from the identified power capacity; and decreasing the brightness of the display panel when the value is out of a critical range, and increasing the brightness of the display panel when the value is within the critical range.

When the plurality of wired remote controllers are connected to the indoor unit and the wired remote controller operates as the master remote controller among the plurality of wired remote controllers, the power saving method may further include adjusting, by the master wired remote controller, the brightness of the display of each of the plurality of wired remote controllers based on the total number of wired remote controllers connected to the indoor unit.

In addition, the power saving method may further include transmitting a startup response to the indoor unit when connected to the indoor unit through the wired interface; and receiving a status of the master remote controller from the indoor unit based on a transmission order of a start-up response among the plurality of wired remote controllers connected to the indoor unit.

In addition, the power saving method may further include receiving, by the master wired remote controller among the plurality of wired remote controllers, the information on the power consumption of other wired remote controllers through the wired interface, calculating the total power consumption of the plurality of wired remote controllers by summing the power consumption of other wired remote controllers and the power consumption of the wired remote controller, and reducing the brightness of the display panel of each of the plurality of wired remote controllers when the value obtained by subtracting the power consumption of the indoor unit and the calculated total power consumption of the plurality of wired remote controllers from the identified power capacity is out of the critical range and increasing the brightness of each display panel of the plurality of wired remote controllers when the value is within the critical range.

In addition, the power saving method may further include setting the brightness of the display panel to 50% during initial communication with the indoor unit, in which, in the adjusting of the brightness of the display panel, based on the identified power capacity and the received power consumption of the indoor unit, it is possible to increase or decrease the brightness of the display panel by more than 50%.

In addition, the power saving method may further include adjusting a communication cycle between the indoor unit and other wired remote controllers among the plurality of wired remote controllers based on the total number of wired remote controllers connected to the indoor unit.

In addition, the power saving method may further include turning off the display panel when no user manipulation is input to the wired remote controller for a preset waiting time while the display panel is turned on, and adjusting the waiting time based on the number of wired remote controllers connected to the indoor unit.

Figure 6:
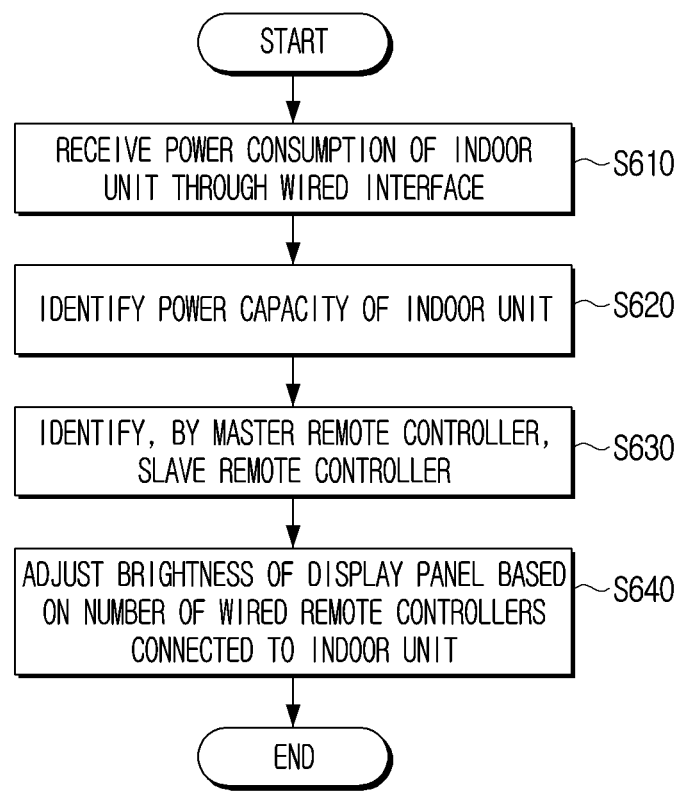
FIG. 6 is a flowchart illustrating a power saving method for a plurality of wired remote controllers according to an embodiment of the disclosure.

FIG. 6 is a flowchart illustrating a power saving method for a plurality of wired remote controllers according to an embodiment of the disclosure.

A description based on the wired remote controller operating as the master remote controller is made with reference to FIG. 6.

Referring to FIG. 6, the wired remote controller receives information on the power consumption of the indoor unit at operation S610, identifies the power capacity of the indoor unit from the pre-stored information at operation S620, and then identifies the slave remote controller at operation S630. The wired remote controller adjusts the brightness of the display panel of the plurality of wired remote controllers based on the total number of wired remote controllers connected to the indoor unit at operation S640.

That is, the brightness of the display panel of the wired remote controller is adjusted according to the power consumption of the indoor unit, the power capacity of the indoor unit, and the number of wired remote controllers connected to the indoor unit. A specific example thereof will be described with reference to FIG. 7.

FIG. 7 is a diagram for describing brightness of a display panel according to a power capacity of an indoor unit and the number of wired remote controllers connected to the indoor unit according to an embodiment of the disclosure.

The table shown in FIG. 7 exemplifies a method of adjusting brightness by simply considering only the power capacity of the indoor unit and the number of wired remote controllers connected to the indoor unit, without considering the power consumption of the indoor unit.

Although LCD brightness is illustrated on the assumption that the display panel is implemented as an LCD in FIG. 7, according to various embodiments of the disclosure, it is not necessarily limited to adjusting the brightness of the LCD.

Specifically, when the wired remote controller identifies the power capacity of the indoor unit as 1000 Watts (W), and the number of wired remote controllers connected to the corresponding indoor unit is two, the master wired remote controller may adjust the brightness of the display of the plurality of wired remote controllers connected to the indoor unit to 60%.

In addition, when the wired remote controller identifies the power capacity of the indoor unit as 700 W, and the number of wired remote controllers connected to the corresponding indoor unit is two, the master wired remote controller may adjust the brightness of the display of the plurality of wired remote controllers connected to the indoor unit to 40%.

In other words, since the smaller the power capacity of the indoor unit, the greater the number of wired remote controllers connected to the indoor unit and the greater the need for energy saving, the master wired remote controller adjusts the brightness of the display panel of the plurality of wired remote controllers connected to the indoor unit to a larger and smaller value.

Figure 8:
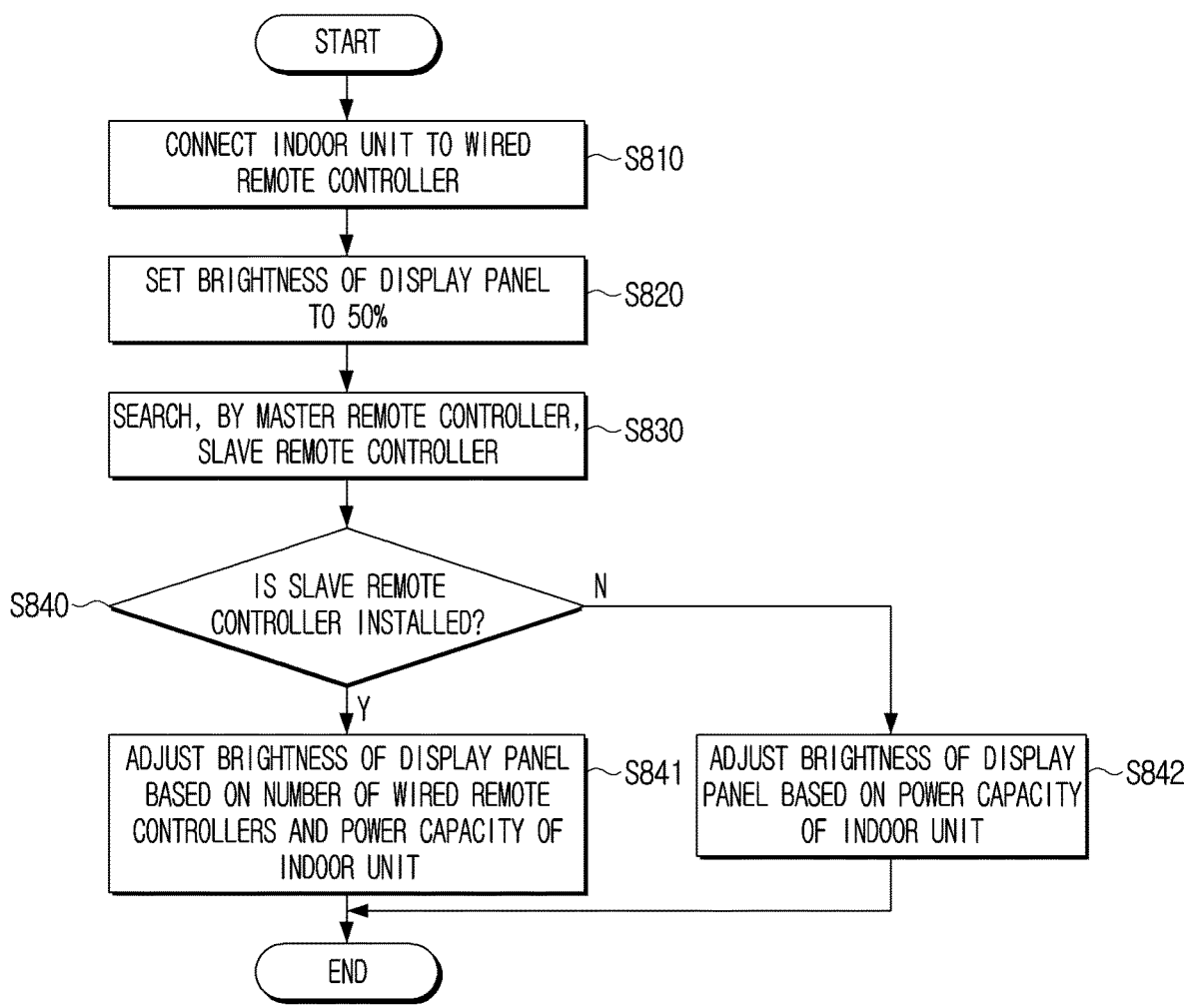
FIG. 8 is a flowchart illustrating a power saving method for initial brightness and brightness adjustment of a display panel according to an embodiment of the disclosure.

FIG. 8 is a flowchart illustrating a power saving method for initial brightness and brightness adjustment of a display panel according to an embodiment of the disclosure.

When the wired remote controller is connected to the indoor unit at operation S810, the brightness of the display panel is set to 50% and the communication may start at operation S820. The value of 50% is just an example of an appropriate value that does not affect the operation of the indoor unit when the wired remote controller is connected to the indoor unit, and the manufacturers can set the brightness value of the initial display panel to any other value. However, in FIG. 8, it is assumed that the initial brightness value is 50%.

In this case, when the plurality of wired remote controllers are connected to the indoor unit, the master wired remote controller searches for the slave wired remote controller at operation S830 and identifies the number of wired remote controllers connected to the indoor unit at operation S840. The search of the slave wired remote controller may be made in a way that the master wired remote controller broadcasts a query to peripheral devices connected through the wired interface and then receives a response thereto. When each wired remote controller has a wireless interface, each wired remote controller may search for peripheral devices using the wireless interface. Alternatively, when a new wired remote controller is connected to the indoor unit, the search may be made in such a way that the indoor unit notifies the master wired remote controller of the connection of the new device. In addition, the search of the slave wired remote controller may be performed in various ways.

Referring to FIG. 8, when the power consumption of the indoor unit is not taken into account, when the slave wired remote controller is not installed, the brightness of the display panel may be adjusted in consideration of only the power capacity of the indoor unit at operation S842.

However, when it is identified that the slave remote controller is connected, the brightness of the display panel is adjusted in consideration of both the number of wired remote controllers connected to the indoor unit and the power capacity of the indoor unit at operation S841.

As described above, in addition to or separately from adjusting the brightness of the display panel, the communication cycle of each wired remote controller may be adjusted or the waiting time of the user manipulation may be adjusted.

Figure 9:
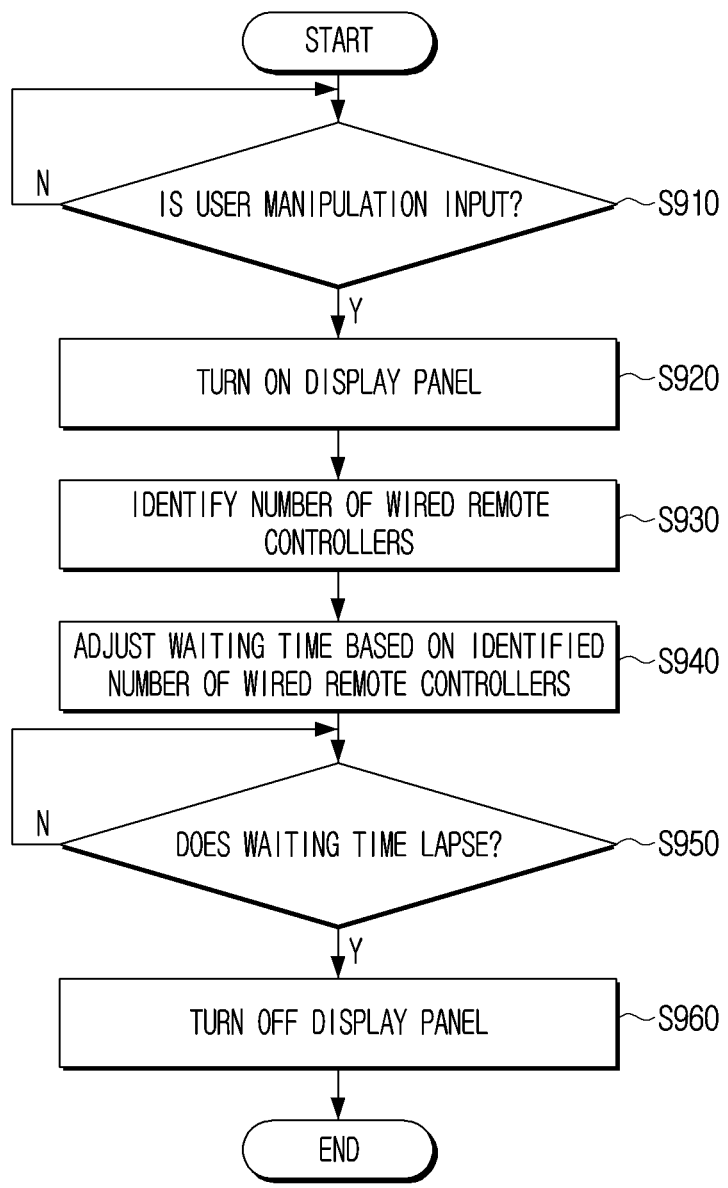
FIG. 9 is a flowchart illustrating shortening of a waiting time of a display panel according to an embodiment of the disclosure.

FIG. 9 is a flowchart illustrating shortening of a waiting time of a display panel according to an embodiment of the disclosure.

When the user operates the wired remote controller at operation S910, the wired remote controller turns on the display panel at operation S920. The user manipulation may be implemented in various forms, such as a touch on the display panel of the wired remote controller, selection of a button provided in the wired remote controller, input of a voice trigger command, input of a motion trigger command, and the like. The wired remote controller activates various internal components simultaneously or sequentially while turning on the display panel. Accordingly, a series of user manipulations are detected and the corresponding control operation is performed. The waiting time may be determined by default for each wired remote controller, and when there are many wired remote controller connections, it may be set differently depending on the number of connections. When only one wired remote controller is connected, the wired remote controller calculates the value obtained by subtracting the power consumption of the indoor unit and the power consumption of the wired remote controller from the power capacity of the indoor unit, and compares the value with the critical range. The wired remote controller shortens the waiting time shorter than the default value when the value is out of the critical range. After that, when the power consumption situation improves, the wired remote controller may restore the waiting time back to the default value. Alternatively, when the usable power of the wired remote controller becomes larger, the wired remote controller may restore the waiting time to more than the default value.

When several wired remote controllers are connected, the master wired remote controller may determine the waiting time of each wired remote controller.

Assuming that the wired remote controller of FIG. 9 is the master wired remote controller, the master wired remote controller identifies the number of wired remote controllers connected to the indoor unit at operation S930 and adjusts the waiting time at operation S940.

For example, when the initial setting value of the waiting time is 5 minutes, if two wired remote controllers are connected, the master wired remote controller may shorten the waiting time to 1 minute.

When it is identified that three wired remote controllers are connected to the indoor unit, the master wired remote controller may shorten the waiting time to 10 seconds.

When the waiting time elapses after the last user manipulation of the wired remote controller at operation S950, the wired remote controller turns off the display panel at operation S960. The wired remote controller may reduce the power consumption by leaving only a minimum of components (e.g., touch sensor, button, etc.) for detecting the user manipulation and turning the rest of the components into an inactive state.

By shortening the waiting time, it is possible to reduce the power consumed by the wired remote controller.

Figure 10:
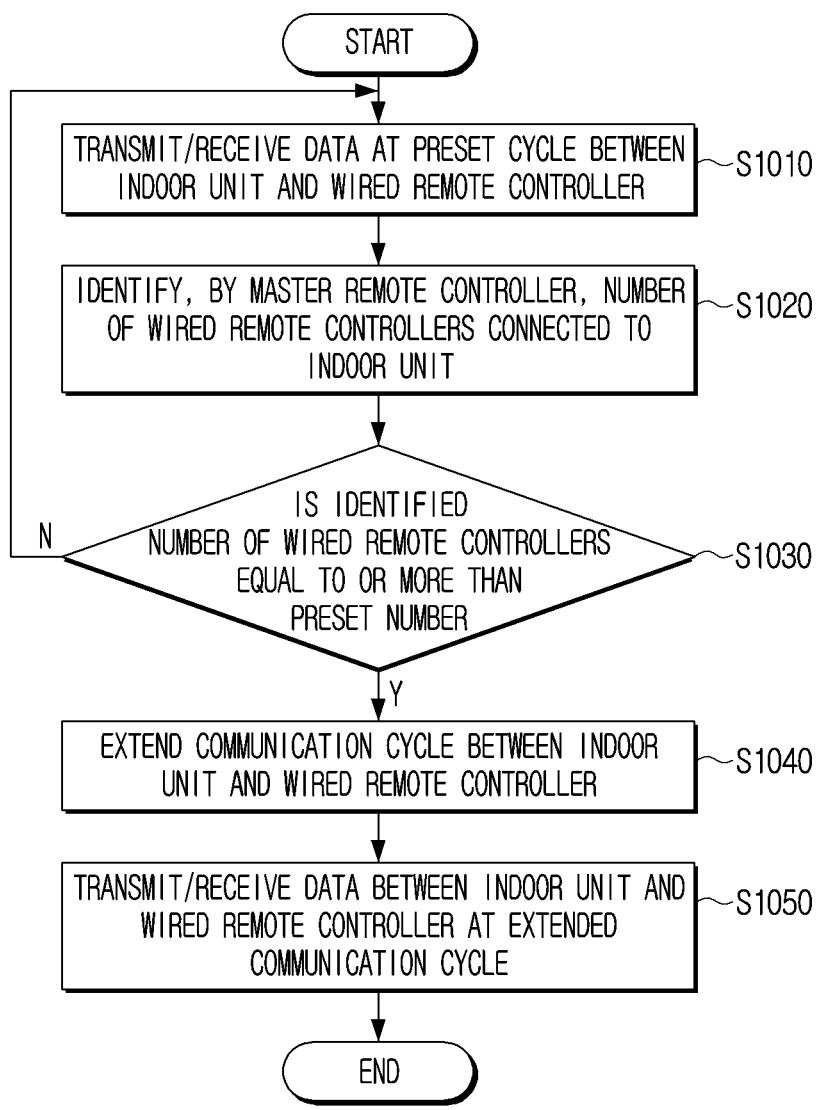
FIG. 10 is a flowchart for describing an extension of a communication cycle between an indoor unit and a wired remote controller or other wired remote controllers according to an embodiment of the disclosure.

FIG. 10 is a flowchart for describing an extension of a communication cycle between an indoor unit and a wired remote controller or a wired remote controller according to an embodiment of the disclosure.

Data may be transmitted/received between the indoor unit and the wired remote controller or between the plurality of wired remote controllers at a preset cycle at operation S1010. The master wired remote controller identifies the number of wired remote controllers when the plurality of wired remote controllers are connected to the indoor unit at operation S1020, and extends the data communication cycle between the indoor unit and the wired remote controller or the plurality of wired remote controllers when the identified number of wired remote controllers is equal to or greater to a preset number at operations S1030 and S1040. For example, when there is one wired remote controller connected to the indoor unit, the communication cycle may be 40 seconds. When two wired remote controllers connected to the indoor unit are identified, the master wired remote controller may extend the communication cycle to 80 seconds.

When three wired remote controllers connected to the indoor unit are identified, the master wired remote controller may extend the communication cycle to 160 seconds. At operation S1050, the indoor unit and the wired remote controller transmits and receives data based on the extended communication cycle.

By extending the communication cycle, it is possible to reduce the power consumed by the wired remote controller. As described above, regardless of the number of wired remote controllers, it is of course also possible to adjust the communication cycle by comprehensively considering the power consumed by each wired remote controller, the power capacity of the indoor unit, and the power consumption.

According to various embodiments as described above, it is possible to prevent a situation in which the operation of the indoor unit is restricted according to the amount of power consumed by the wired remote controller connected to the indoor unit by wire.

Various power saving methods and control methods described above may be stored and distributed in a recording medium in the form of a program code for performing the method. When such a recording medium is loaded in the wired remote controller or the program code is downloaded and executed in the memory of the wired remote controller, as described above, an appropriate power saving operation is performed based on the amount of power consumption of the wired remote controller, the power capacity of the indoor unit, and the like.

Here, the recording medium may be various types of computer-readable media such as a read only memory (ROM), a random access memory (RAM), a memory chip, a memory card, an external hard drive, a hard drive, a compact disc (CD), a digital versatile disc (DVD), a magnetic disk, or a magnetic tape.

While the disclosure has been shown and described with reference to various embodiments thereof, it will be understood by those skilled in the art that various changes in form and details may be made therein without departing from the spirit and scope of the disclosure as defined by the appended claims of and their equivalents.

What is claimed is:

1. A wired remote controller for controlling an indoor unit, the wired remote controller comprising:
   a display panel;
   a wired interface that is connected to the indoor unit by wire;
   a memory in which information on a power capacity for each indoor unit model is stored; and
   a processor that receives power from the indoor unit through the wired interface and communicates with the indoor unit through the wired interface,
   wherein the processor is configured to:
      receive information on power consumption of the indoor unit through the wired interface,
      identify a power capacity corresponding to the indoor unit based on the information on the power capacity stored in the memory, and
      increase or decrease brightness of the display panel based on a relationship of a difference between the identified power capacity and the received information on power consumption of the indoor unit to a critical range.

2. The wired remote controller of claim 1,
   wherein the processor is further configured to:
      calculate power consumption of the wired remote controller,
   wherein the brightness of the display panel is reduced when a value obtained by subtracting the received information on power consumption of the indoor unit and the calculated power consumption of the wired remote controller from the identified power capacity is out of the critical range, and
   wherein the brightness of the display panel is increased when the subtracted value is within the critical range.

3. The wired remote controller of claim 1, wherein, when a plurality of wired remote controllers are connected to the indoor unit and the wired remote controller operates as a master remote controller among the plurality of wired remote controllers, the processor is further configured to increase or decrease the brightness of the display panel of each of the plurality of wired remote controllers based on a total number of wired remote controllers connected to the indoor unit.

4. The wired remote controller of claim 3, wherein, when the processor is connected to the indoor unit through the wired interface, the processor is further configured to:

transmit a start-up response to the indoor unit; and
operate as a master or a slave according to a transmission order of the start-up response between the plurality of wired remote controllers connected to the indoor unit.

5. The wired remote controller of claim 3, wherein the processor is further configured to:
receive information on power consumption of other wired remote controllers among the plurality of wired remote controllers through the wired interface;
calculate a total power consumption of the plurality of wired remote controllers by summing the power consumption of the other wired remote controllers and the power consumption of the wired remote controller;
reduce the brightness of the display panel of each of the plurality of wired remote controllers when a value obtained by subtracting the power consumption of the indoor unit and the total power consumption of the plurality of wired remote controllers from the identified power capacity is out of the critical range; and
increase the brightness of the display panel of each of the plurality of wired remote controllers when the subtracted value is within the critical range.

6. The wired remote controller of claim 3, wherein the processor is further configured to adjust a communication cycle between the indoor unit and other wired remote controllers among the plurality of wired remote controllers based on the total number of wired remote controllers connected to the indoor unit.

7. The wired remote controller of claim 3, wherein the processor is further configured to:
turn off the display panel when no user manipulation is input to the wired remote controller for a preset waiting time while the display panel is turned on; and
adjust a waiting time based on the total number of wired remote controllers connected to the indoor unit.

8. The wired remote controller of claim 1, wherein the processor is further configured to:
receive information on the indoor unit model through the wired interface; and
identify a power capacity corresponding to the received information on the indoor unit model based on information stored in the memory.

9. The wired remote controller of claim 8, wherein, when at least one of the information on the indoor unit model and the information on the power capacity corresponding to the information on the indoor unit model is not stored in the memory, the processor is further configured to request the information on the power capacity of the indoor unit through the wired interface.

10. The wired remote controller of claim 1, wherein the processor is further configured to:
set the brightness of the display panel to 50% during initial communication with the indoor unit; and
increase or decrease the brightness of the display panel by more than 50% based on the identified power capacity and the received information on power consumption of the indoor unit.

11. The wired remote controller of claim 1, wherein the critical range is set to an appropriate value in preparation to increase the power consumption of the indoor unit due to received input.

12. A power saving method for a wired remote controller connected to an indoor unit through a wired interface, the power saving method comprising:
receiving information on power consumption of the indoor unit through the wired interface;
identifying a power capacity corresponding to the indoor unit based on pre-stored information on power capacity for each indoor unit model; and
increasing or decreasing brightness of a display panel provided in the wired remote controller based on a relationship of subtracting a sum of the power consumption of the received indoor unit and power consumption of the wired remote controller from the identified power capacity of the indoor unit to a critical range.

13. The power saving method of claim 12, wherein the increasing or decreasing of the brightness of the display panel includes:
calculating the power consumption of the wired remote controller;
calculating a value obtained by subtracting the received information on power consumption of the indoor unit and the calculated power consumption of the wired remote controller from the identified power capacity;
decreasing the brightness of the display panel when the value is out of the critical range; and
increasing the brightness of the display panel when the value is within the critical range.

14. The power saving method of claim 12, further comprising:
increasing or decreasing the brightness of the display panel of each of a plurality of wired remote controllers based on a total number of wired remote controllers connected to the indoor unit when a plurality of wired remote controllers are connected to the indoor unit and the wired remote controller operates as a master remote controller among the plurality of wired remote controllers.

15. The power saving method of claim 14, further comprising:
transmitting a startup response to the indoor unit when connected to the indoor unit through the wired interface; and
receiving a status of the master remote controller from the indoor unit based on a transmission order of a start-up response among the plurality of wired remote controllers connected to the indoor unit.

16. The power saving method of claim 14, further comprising:
receiving information on power consumption of other wired remote controllers among the plurality of wired remote controllers through the wired interface;
calculating a total power consumption of the plurality of wired remote controllers by summing the power consumption of the other wired remote controllers and the power consumption of the wired remote controller;
reducing the brightness of the display panel of each of the plurality of wired remote controllers when a value obtained by subtracting the sum of the power consumption of the indoor unit and the total power consumption of the plurality of wired remote controllers from the identified power capacity is out of the critical range; and
increasing the brightness of the display panel of each of the plurality of wired remote controllers when the subtracted value is within the critical range.

* * * * *